United States Patent
Urbán et al.

(10) Patent No.: US 11,508,527 B2
(45) Date of Patent: Nov. 22, 2022

(54) CAPACITOR, ASSEMBLY COMPRISING A CAPACITOR AND A BUSBAR AND METHOD OF MANUFACTURING A CAPACITOR

(71) Applicant: TDK Electronics AG, Munich (DE)

(72) Inventors: Péter Urbán, Kerecsend (HU); Róbert Bösze, Tanakajd (HU); Dezsö Rauch, Táplánszentkereszt (HU); Krisztián Elekes, Káld (HU); Ottó Klug, Szombathely (HU)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 15/734,007

(22) PCT Filed: May 31, 2019

(86) PCT No.: PCT/EP2019/064217
§ 371 (c)(1),
(2) Date: Dec. 1, 2020

(87) PCT Pub. No.: WO2019/233898
PCT Pub. Date: Dec. 12, 2019

(65) Prior Publication Data
US 2021/0217562 A1 Jul. 15, 2021

(30) Foreign Application Priority Data
Jun. 5, 2018 (DE) .......................... 102018113342.1

(51) Int. Cl.
*H01G 9/008* (2006.01)
*H01G 9/00* (2006.01)
(Continued)

(52) U.S. Cl.
CPC ............... *H01G 9/008* (2013.01); *H01G 2/04* (2013.01); *H01G 9/0029* (2013.01); *H01G 9/06* (2013.01);
(Continued)

(58) Field of Classification Search
CPC ...................................................... H01G 9/012
See application file for complete search history.

(56) References Cited

U.S. PATENT DOCUMENTS

| 5,706,166 | A | 1/1998 | Schweikert et al. |
| 2012/0267161 | A1* | 10/2012 | Yano ................. H01G 4/228 174/520 |

(Continued)

FOREIGN PATENT DOCUMENTS

| CN | 203150398 U | 8/2013 |
| CN | 205050700 U | * 2/2016 |

(Continued)

*Primary Examiner* — Eric W Thomas
(74) *Attorney, Agent, or Firm* — Slater Matsil, LLP

(57) ABSTRACT

A capacitor, an assembly comprising a capacitor and a busbar and a method for manufacturing a capacitor are disclosed. In an embodiment a capacitor includes a winding element and a terminal having a first part of a first material and a second part of a second material, the second material being different than the first material, wherein the first part is electrically contacted to the winding element, and wherein the second part is an external contact of the capacitor.

18 Claims, 2 Drawing Sheets

(51) Int. Cl.
*H01G 9/08* (2006.01)
*H01G 9/15* (2006.01)
*H01G 9/28* (2006.01)
*H01G 2/04* (2006.01)
*H01G 9/10* (2006.01)
*H01G 9/06* (2006.01)

(52) U.S. Cl.
CPC ................. *H01G 9/08* (2013.01); *H01G 9/10* (2013.01); *H01G 9/151* (2013.01); *H01G 9/28* (2013.01)

(56) References Cited

U.S. PATENT DOCUMENTS

2015/0187508 A1* 7/2015 Cho .................... H01G 9/08
361/531
2015/0371783 A1* 12/2015 Chen .................... H01G 9/0029
29/25.03

FOREIGN PATENT DOCUMENTS

| | | |
|---|---:|---|
| CN | 208608068 U | 3/2019 |
| DE | 1937787 U | 5/1966 |
| DE | 29921146 U1 | 3/2000 |
| DE | 102004034276 A1 | 2/2006 |
| EP | 0083271 A2 | 7/1983 |
| GB | 700142 A | 11/1953 |
| JP | H0212907 A | 1/1990 |
| JP | H07307249 A | 11/1995 |
| JP | H0897089 A | 4/1996 |
| JP | 2000021684 A | 1/2000 |
| WO | 2011052091 A1 | 5/2011 |
| WO | 2015031099 A1 | 3/2015 |

\* cited by examiner

CAPACITOR, ASSEMBLY COMPRISING A CAPACITOR AND A BUSBAR AND METHOD OF MANUFACTURING A CAPACITOR

This patent application is a national phase filing under section 371 of PCT/EP2019/064217, filed May 31, 2019, which claims the priority of German patent application 102018113342.1, filed Jun. 5, 2018, each of which is incorporated herein by reference in its entirety.

TECHNICAL FIELD

The present invention concerns a capacitor, an assembly comprising the capacitor and a busbar and a method of manufacturing a capacitor.

SUMMARY

Design, quality and durability of the surface contact between a terminal of a capacitor and a busbar are emerging as predominant limiting factors for ripple current ratings in aluminum electrolytic capacitors, in particular in circuit designs of increasing volumetric power density. The electrochemical nature of wet aluminum electrolytic capacitors determines the material of the internal contacts of the terminal. For a wet aluminum electrolytic capacitor, the terminal has to comprise a high purity aluminum. However, this material is not optimal for an external contact, for example due to its low mechanical strength, its surface roughness and its vulnerability to climatic-induced oxidation and surface corrosion.

Moreover, in other types of capacitors, there are also different requirements regarding the internal contact of a terminal to the winding element and the external contact of the terminal which is configured to be connected to a busbar.

Embodiments provide an improved capacitor, for example, a capacitor which is configured to at least partly fulfill these requirements. Further embodiments provide an improved method of manufacturing a capacitor.

A capacitor is provided which comprises a winding element and a terminal. The terminal comprises a first part of a first material and a second part of a second material wherein the second material is different from the first material. The first part of the terminal is electrically contacted to the winding element and the second part of the terminal is configured to provide an external contact of the capacitor.

The first part may comprise the first material or the first part may consist of the first material. The second part may comprise the second material or the second part may consist of the second material.

The first material of the first part can be chosen so as to be optimized for the internal contact to the winding element. In particular, the capacitor may be an aluminum electrolytic capacitor, more particular a wet aluminum electrolytic capacitor. In this case, the first material is aluminum, preferably a high purity aluminum which may comprise aluminum with a purity of more than 99.5%.

The second material of the second part can be optimized for the requirements of the external contact. In particular, the material of the second part can have a higher mechanical strength and can, therefore, withstand stronger mounting torques. When a busbar is fixed to the terminal by screwing, the strength of this connection is determined by the applied tightening torque. The first material may withstand only relative small tightening torques. The second material, however, can withstand stronger tightening torques, thereby allowing to fix the busbar stronger to the terminal. A higher screw tightening torque results in a reduced contact resistance between the busbar and the terminal. A reduced contact resistance corresponds to a better ripple current capability of the capacitor.

A mechanically soft material of the outer contact would impose limits to a dimensioning of a thread and a subsequent allowed mounting torque. By providing a hard second material, this disadvantage can be overcome.

A single material terminal would limit the choice of the terminal material to a material which is suitable for the internal contact, in particular to high purity aluminum for aluminum electrolytic capacitors. A capacitor according to embodiments allows to provide a second material which can be chosen in view of the requirements of the contact to the busbar, e.g. that allows for an increased maximum allowed ripple current load.

The second material may provide an improved surface roughness compared to the first material due its precise machining.

Moreover, the second material can be chosen as a material which is less vulnerable to surface corrosion in various climatic conditions, e.g. humidity, high or low pH etc., than the first material. Oxidative corrosion processes can reach and penetrate the contact surfaces during the lifetime of the capacitor and this would further deteriorate the allowed ripple current capability of the capacitors. An appropriate choice of the second material can prevent the oxidative corrosion processes at the contact surface.

The first part and the second part can be electrically contacted and mechanically connected to each other.

The terminal of the capacitor may be configured to provide an electrical contact of the capacitor to an external busbar. The busbar may directly abut the second part of the terminal when the capacitor is assembled to the busbar. Busbars typically consist of copper. The second material can be chosen to provide good properties when in surface contact to a copper busbar. A surface contact of copper to aluminum results in various disadvantages due to the tendency of aluminum to oxidation and, therefore, has a high contact resistance. Moreover, aluminum has a low mechanical strength which also results in disadvantages in the surface contact to the busbar.

The winding element may be in direct mechanical contact with the first part. In particular, the first part may be fixed to a tab of the winding element.

The first part may comprise an opening and the second part may be arranged in the opening of the first part.

For example, the first part may form a receptacle which is configured to receive the second part. The opening of the first part may be a bore hole. The first part may be configured to be fixed to the winding element before an impregnation step in the manufacturing process of the capacitor. The second part may be configured to be introduced into the opening of the first part in a final assembly step of the capacitor, in particular the second part may be configured to be arranged in the opening of the first part after the final assembly process, in particular well after the impregnation. By providing a first part which comprises an opening, it is easily possible to construe a manufacturing process wherein the second part can be arranged in the opening in the final manufacturing step. This provides the advantage that the second part can balance out and re-correct any previously generated and usually unavoidable distortions of the co-planarity of the terminals of the capacitor. If the terminals were preassembled, it would not be possible to balance out manufacturing tolerances by positioning the second part relative to the first part.

The second part may be an insert. The insert may be placed in the opening of the first part in the final assembly step.

The second part may be screwed into the opening of the first part. By adjusting the depth along which the second part is screwed into the first part, corrections of the height of the terminal can be performed. Thereby, the terminal can be adjusted in its height. The height of the terminal may be defined as a distance by which the terminal protrudes out of a housing of the capacitor. The height of the terminal may, thereby, be measured in a direction perpendicular to the surface of the housing at which the terminal is arranged.

The second part may comprise a self-tapping thread, wherein the second part is mechanically connected to the first part by the self-tapping thread. The self-tapping thread may be an outer thread of the second part.

The self-tapping thread may provide a connection to the first part which is very tight. The second material may carve a grove into the first material when fixing the second part to the first part. Thereby, a connection between the second material and the first material can be formed which is very tight so that the first material is not prone to oxidation. The forming of a thick oxide layer on the first material can thereby be prevented.

The self-tapping assembly can provide a contact which is very tight so that the contact resistance is small. In particular, a contact resistance can be provided which is significantly smaller than the contact resistance between an industry standard M5/M6 threaded steel screw and a thread of an aluminum terminal.

The winding element may not abut the second part. The second part is optimized for the external contact. Therefore, a direct mechanical connection between the winding element and the second part shall be prevented.

The second part may comprise an inner thread which is configured to be connected to a busbar. In particular, the inner thread may be configured to receive a screw, preferably an industry standard M5/M6 threaded steel screw. The busbar may comprise copper. The second material is ideally suited for surface contact to copper.

The second material may have a higher Young's modulus than the first material. Accordingly, the second material may be mechanically harder. Thus, the second material may withstand higher tightening torques. Accordingly, a busbar can be fixed to the second part of the terminal very tightly, thereby providing a low contact resistance.

The first material may comprise aluminum. The first material may be a high purity aluminum. The first material may be aluminum with a purity of more than 99.5%. The capacitor may be a wet aluminum electrolytic capacitor. For such a capacitor, the internal contacts of a terminal have to be of high purity aluminum due to electrochemical nature of the capacitor.

The second material may comprise or consist of copper or a copper based alloy. Copper has a significantly stronger mechanical strength than aluminum. Therefore, copper or a copper based alloy may provide a higher ripple current capability of the critical contact surface to the busbar, a higher mechanical strength allowing for an increased mounting torque and a reduced surface corrosion when compared to aluminum. Moreover, copper can be manufactured with a lower surface roughness than aluminum. These advantages result in a lower contact resistance and a higher ripple current capability of the capacitor, thereby in an improved capacitor.

The second part may be covered by a coating. The coating may prevent an oxidation of the contact surface of the first part and the second part. The coating may for example comprise nickel. The coating may be applied by electroplating. The first part and the second part may be tightened together so strong that the coating can be omitted as due to the strong contact of the first and the second part, the contact surface is not prone to oxidation.

Alternatively or additionally, the second part may be covered by an auxiliary sealant. The sealant may be a glue-like component which additionally seals the connection between the first part and the second part. The auxiliary sealant may prevent the introduction of moisture or humidity to the contact surface of the first part and the second part.

The second part may be movable relative to the first part so that the height of the terminal is adjustable. For example, when the second part is fixed to the first part by screwing, the depth of the screw connection can be adjusted so that the height of the terminal is set to a desired value. The second part may be movable relative to the first part only during the assembly process. Alternatively, the second part may be movable relative to the first part in the assembled state of the capacitor if a sufficiently high torque is applied to the second part. However, the first part and second part may be adapted such that this sufficiently high torque is so strong that accidental movements of the second part relative to the first part do not occur.

The capacitor may comprise a second terminal comprising a first part of the first material and a second part of the second material. The second terminal may be constructed identically to the terminal described above which is referred to as "first terminal" in the following. Thus, every functional and structural feature discussed with respect to the first terminal also may apply to the second terminal. The first terminal may be the plus terminal of the capacitor and the second terminal may be the minus terminal of the capacitor. Further, the capacitor may comprise further terminals which are also constructed in the same manner as the above described first terminal.

Each of the terminals may comprise a top face which faces away from the winding element wherein the top faces of the terminal are co-planar. The top face of the each terminal may be formed by the respective second part. For example, the top face may be formed by a plate which is part of the second part. Co-planarity of the terminals is essential for a good mechanical connection of the capacitor to the busbar.

Further embodiments provide an assembly comprising a capacitor and a busbar. The capacitor may be the above described capacitor. Accordingly, every structural and functional feature described with respect to the capacitor above or in connection with the figures may also apply to the capacitor of the assembly. The busbar is mechanically fixed and electrically contacted to the second part of the terminal of the capacitor. The busbar may be in direct mechanical contact with the second part, in particular the busbar may be fixed to the second part by screws and washers. The busbar may not abut the first part. Accordingly, no surface contact between the busbar and the first material occur and thus, the first material does not deteriorate the contact resistance of the capacitor to the busbar.

Yet other embodiments provide a method of manufacturing a capacitor. The capacitor may be the above described capacitor.

The method comprises the steps of: a. Electrically contacting a mechanically connecting a winding element to a first part of the terminal wherein the first part comprises a first material; b. impregnating the winding element and the first part of the terminal; and c. electrically contacting and mechanically connecting a second part of the terminal to the first part of the terminal wherein the second part comprises a second material different form the first material.

Step b. may be performed after step a. Step c. may be performed after step b.

The first part may comprise an opening and the second part may be arranged in the opening. As the second part is positioned in the opening in the final assembly step, the second part can adapt for unavoidable manufacturing tolerances. The capacitor may comprise more than one terminal, each terminal comprising a first part and a second part fixed to the first part. Each of the second parts may comprise a top face facing away from the winding element. The method can further comprise the step of d. adjusting the position of each of the second parts with respect to the first part such that the top faces of the second parts are co-planar. This step can either be performed simultaneously with step c. or after step c.

The second part may comprise a self-tapping thread, wherein the second part is mechanically connected to the first part by the self-tapping thread. A self-tapping thread may provide a very tight connection which is not prone to oxidation.

BRIEF DESCRIPTION OF THE DRAWINGS

In the following, the present invention is described in further detail with respect to the figures.

DETAILED DESCRIPTION OF ILLUSTRATIVE EMBODIMENTS

Figure 1:
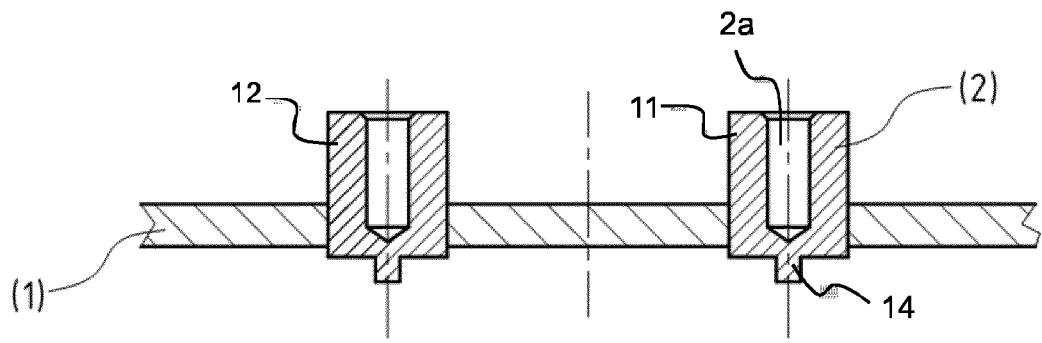
FIG. 1 shows a part of a capacitor before a final assembly step.

FIG. 1 shows a part of a capacitor. In particular, FIG. 1 shows a part of a capacitor during the manufacturing process of the capacitor before a final assembly step.

The capacitor comprises a cover disc 1 which forms a part of a housing of the capacitor. Further, the capacitor comprises two terminals 11, 12 wherein each of the terminals 11, 12 is arranged in an opening of the cover disc 2. The terminals 11, 12 are configured to electrically contact a winding element arranged inside the housing of the capacitor to an external busbar 8, 13 which is not part of the capacitor. One of the terminals 11 is a plus terminal and the other terminal 12 is a minus terminal.

Each of the terminals 11, 12 comprises a first part 2 and a second part 3. The second part 3 has not yet been assembled to the capacitor before the final assembly step as shown in FIG. 1.

The first part 2 forms receptacle. The first part 2 comprises an opening 2a. In particular, the opening 2a is a bore hole. The opening 2a of the first part 2 is configured to receive the second part 3. The first part 2 further comprises a pen-shaped protrusion 14 which faces into the inside of the housing of the capacitor. The protrusion 14 is configured to be directly contacted to a tab 15 of the winding element.

The first part 2 consists of a first material. The first material has a low Young's modulus. The first material is determined by the electrochemical nature of the capacitor. For example, wet aluminum electrolytic capacitors require internal contacts of high purity aluminum, for example of aluminum having a purity of at least 99.5%. The first material is aluminum. In particular, the first material is aluminum having a purity of at least 99.5%.

Figure 2:
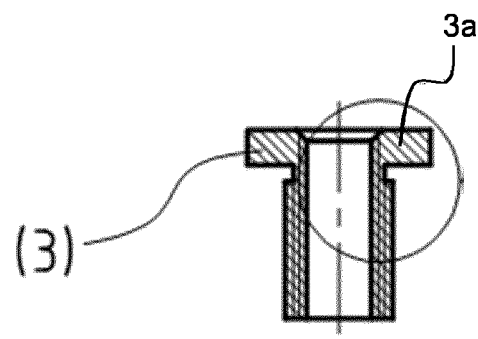
FIG. 2 shows a second part of a terminal of the capacitor.
Figure 3:
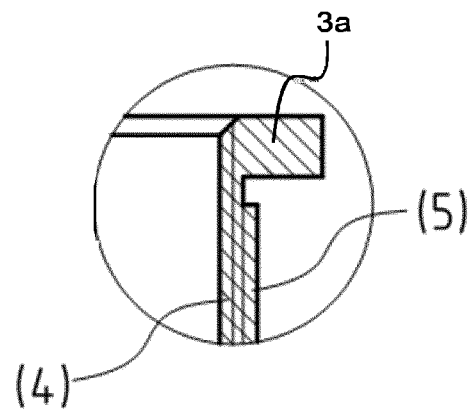
FIG. 3 shows an enlarged view of a part of the second part.

FIG. 2 shows the second part 3 which is configured to be mounted into the opening 2a of the first part 2. The second part 3 is an insert which can be received in the opening 2a. FIG. 3 shows an enlarged view of a part of the second part 3. This part is marked by a circle in FIG. 2.

The second part 3 is made of a second material which has a higher Young's modulus than the first material. The second part 3 is configured to provide the outer contact of the capacitor to the busbar 8, 13. Further, in the assembled capacitor, the second part 3 is mechanically fixed and electrically connected to the first part 2.

The second part 3 forms a sleeve. The second part 3 comprises an inner thread 4 and an outer thread 5. The inner thread 4 is configured to receive a screw 9 wherein the second part 3 can be fixed to a busbar 8, 13 by the screw 9 and by a washer 10.

The outer thread 5 is configured to mechanically connect the second part 3 to the first part 2 of the terminal. The outer thread 5 is a self-tapping thread. During the final assembly step of the capacitor, the second part 3 is screwed into the first part 2. As the second material is harder than the first material, the self-tapping outer thread 5 of the second part 3 carves a groove 7 or thread into the inner surface of the first part 2.

Further, the second part 3 comprises a top plate 3a which defines a top face of the second part 3 which faces away from the first part 2 of the terminal. The top plate 3a of the second part 4 abuts the busbar 8, 13 when the capacitor is assembled to the busbar 8, 13. The top plate 3a comprises a hole. When the terminal is fixed to a busbar 8, 13 by the screw 9, the screw 9 can pass through the hole.

Each of the sleeve having the inner thread 4 and the outer thread 5 and the top plate 3a consists of the second material. The second material is harder than the first material. The second material has a higher Young's modulus than the first material. The second material is preferably copper or comprises copper. The second material may be a copper based alloy or may comprise a copper based alloy.

The second part 3 provides the outer contact of the capacitor, i.e. the contact to the busbar 8, 13. Due to the use of the second material, multiple disadvantages of an outer contact of aluminum can be overcome:

The busbar 8, 13 typically consists of copper. The contact surface of the second material and the busbar 8, 13 has a higher ripple current capability than a connection of the busbar 8, 13 to aluminum. For example, in case that the second material is copper or a copper based alloy, a contact surface of either copper to copper or copper to a copper based alloy is provided, both resulting in a ripple current capability that is significantly higher than the ripple current capability of a copper to aluminum contact surface and both resulting in a contact resistance that is more than an order of magnitude smaller than the contact resistance of a copper to aluminum contact surface.

Further, aluminum is very prone to oxidization. Thus, thick oxide layers form on components made of aluminum. As the second material a material is chosen that is less prone to oxidization. For example, copper and copper based alloys are less likely to oxidize compared to aluminum. Accordingly, the use of the second material can prevent the formation of a thick oxide layer at the contact surface of the terminal 11, 12 and the busbar 8, 13. Such a thick oxide layer would deteriorate the allowed ripple current capability. The second part 3 of the second material shows a reduced surface corrosion compared to aluminum.

Moreover, as the second material a material is chosen that has a higher mechanical strength than aluminum, e.g. that has a higher Young's modulus than aluminum. Accordingly, the connection of the second part 3 to the busbar 8, 13 has a higher mechanical strength and can therefore tolerate an increased mounting torque compared to a connection of the busbar 8, 13 with an aluminum component.

The second material has a reduced surface roughness compared to the surface roughness of aluminum. The surface roughness of the state of the art manufacturing of aluminum terminals, e.g. by cold forming, is inferior compared to a machined surface of the second material.

Further, the second part 3 is fixed to the first part 2 of the terminal by the outer thread 5. As the outer thread 5 is self-tapping a very tight connection between the second part 3 and the first part 2 can be formed during the assembly of the second part 3 to the first part 2. Thus, the contact surface of the second part 3 to the first part 2 is not prone to oxidation. No oxide layer, or at least no thick oxide layer, is formed at the contact surface of the two parts 2, 3 and, therefore, the contact resistance is not significantly increased.

The connection of the second part 3 to the first part 2 is so tight that it can be considered as being self-sealing. In other words, a corrosion of the contact surface and an entrance of moisture into the contact surface of the second part 3 and the first part 2 is prevented.

Figure 4:
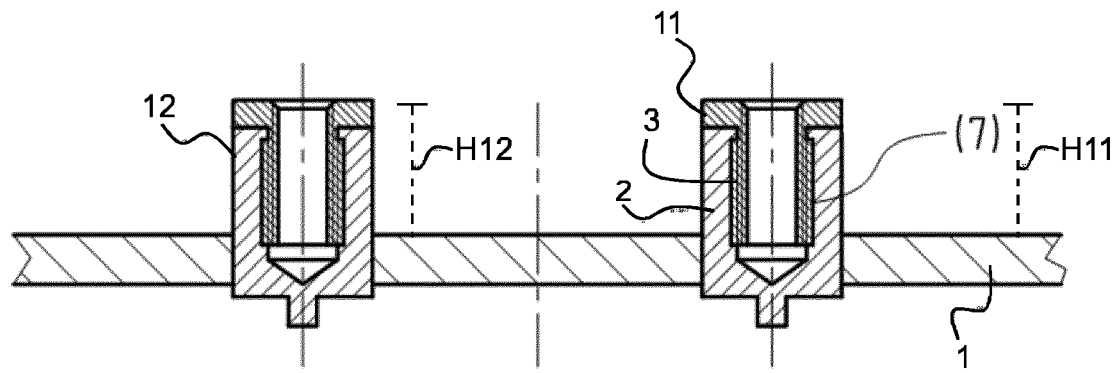
FIG. 4 shows the part of the capacitor after the final assembly step.

FIG. 4 shows the part of the capacitor shown in FIG. 1 after the last assembly step of the capacitor has been completed. The second part 3 has been arranged inside the opening 2a of the first part 2.

In FIG. 4, the two second parts 2, 3 are arranged such that their respective top plates 3a are co-planar. By arranging the second parts 3 in the first part 2, it is possible to adjust for manufacturing tolerances of the first part 2 of the terminal. For example, one second part 3 may be screwed deeper into the respective first part 2 than the other second part 3 in order to adapt for manufacturing tolerances. Thus, the second parts 3 allow to increase the co-planarity of the terminals 11, 12 as the second parts 3 allow to balance out and re-correct any previously generated and often unavoidable distortions of the co-planarity of the terminals 3.

In other words, the terminals 11, 12 have the same height. The height of terminal 11 is marked as H11 in FIG. 4 and the height of terminal 12 is marked as H12.

Figure 5:
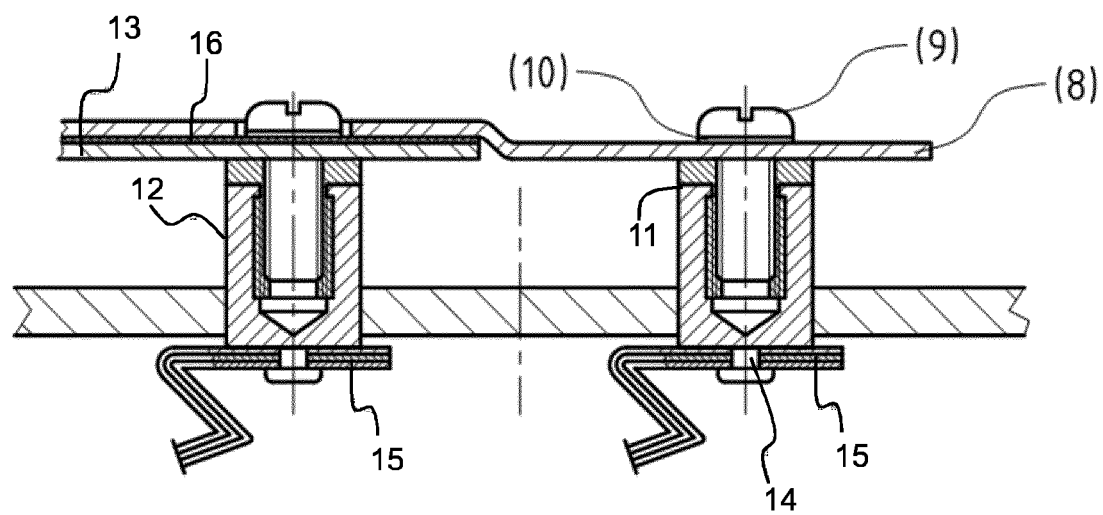
FIG. 5 shows an assembly comprising the capacitor and two busbars.

FIG. 5 shows an assembly comprising the previously described capacitor and two busbars 8, 13. One of the busbars 8 is fixed to the first terminal 11 by a conventional screw 9 and a washer 10 wherein the screw 9 is screwed into the inner thread 4 of the second part 3. The other busbar 13 is fixed to the other terminal 12 by a second screw 9. The busbars 8, 13 are in direct contact only to the top plates 3a of the second part 3, i.e. to the second material. The two busbars 8, 13 are separated by an insulator 16.

Furthermore, FIG. 5 shows a part of the winding element. In particular, the winding element comprises tabs 15 which are fixed to the protrusion 14 of the first part 2 of the terminal. The tabs 15 comprise holes wherein the protrusion 14 is arranged inside the hole. Afterwards, the protrusion 14 is riveted to the tabs 15, thereby permanently fixing the tabs 15 to the terminal 11, 12. The winding element, i.e. the tabs 15, are in direct contact only to the first part 2, i.e. to the first material.

We claim:

1. A capacitor comprising:
   a winding element; and
   a terminal comprising a first part of a first material and a second part of a second material, the second material being different than the first material,
   wherein the first part is electrically contacted to the winding element,
   wherein the second part is an external contact of the capacitor,
   wherein the second part forms a sleeve and comprises an inner thread and an outer thread,
   wherein the inner thread is configured to receive a screw,
   wherein the second part is screwed into the first part, and
   wherein manufacturing tolerances are adjusted for by setting a depth by which the second part is screwed into the first part.

2. The capacitor according to claim 1,
   wherein the first part comprises an opening, and
   wherein the second part is arranged in the opening of the first part.

3. The capacitor according to claim 2, wherein the second part is screwed into the opening of the first part.

4. The capacitor according to claim 1, wherein the second part comprises a self-tapping thread and is mechanically connected to the first part by the self-tapping thread.

5. The capacitor according to claim 1, wherein the winding element does not abut the second part.

6. The capacitor according to claim 1, wherein the second part comprises the inner thread configured to be contacted to a busbar.

7. The capacitor according to claim 1, wherein the second material has a higher Young's modulus than the first material.

8. The capacitor according to claim 1, wherein the first material comprises aluminum.

9. The capacitor according to claim 1, wherein the second material comprises copper or a copper based alloy.

10. The capacitor according to claim 1, wherein the second part is covered by a coating.

11. The capacitor according to claim 1, wherein the second part is movable relative to the first part so that a height of the terminal is adjustable.

12. The capacitor according to claim 1, further comprising a second terminal comprising a first part of the first material and a second part of the second material, wherein each of the terminals comprises a top face which faces away from the winding element, and wherein the top faces of the terminals are co-planar.

13. The capacitor according to claim 12, further comprising a cover disc, wherein each of the terminals is arranged in an opening of the cover disc.

14. The capacitor according to claim 13, wherein the cover disc forms a part of a housing of the capacitor.

15. An assembly comprising:
    the capacitor according to claim 1; and
    a busbar,
    wherein the busbar is mechanically fixed and electrically contacted to the second part of the terminal.

16. A method for manufacturing a capacitor, the method comprising:

electrically contacting and mechanically connecting a winding element to a first part of a terminal, wherein the first part comprises a first material, impregnating the winding element and the first part of the terminal; and electrically contacting and mechanically connecting a second part of the terminal to the first part of the terminal, wherein the second part comprises a second material different from the first material, wherein the second part forms a sleeve and comprises an inner thread and an outer thread, wherein the inner thread is configured to receive a screw, wherein the second part is screwed into the first part, and wherein manufacturing tolerances are adjusted for by setting a depth by which the second part is screwed into the first part.

17. The method according to claim 16, wherein the capacitor comprises more than one terminal, each terminal comprising a first part and a second part fixed to the first part, wherein each of the second parts comprises a top face which faces away from the winding element, and wherein the method further comprises adjusting a position of each of the second parts with respect to the first part such that the top faces of the second parts are co-planar.

18. The capacitor according to claim 8, wherein the second material comprises copper or a copper based alloy.

* * * * *